A. BEEKMAN.
Propelling Boats.
No. 143,270. Patented September 30, 1873.
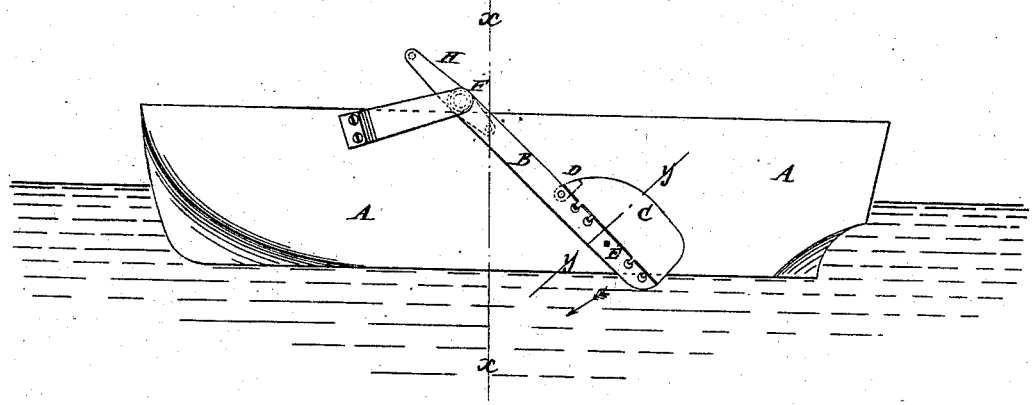
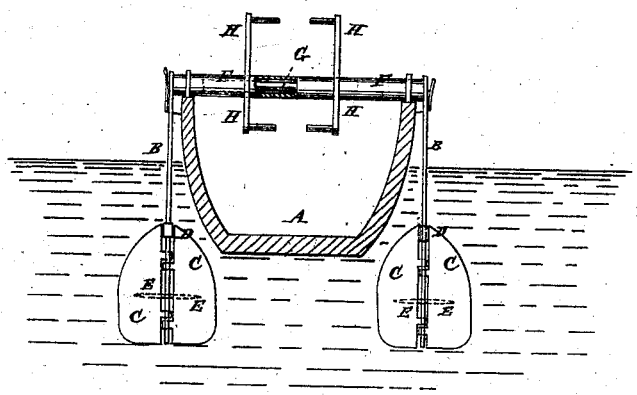
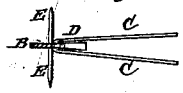
Witnesses:
A. W. Almqvist
C. Sedgwick
Inventor:
A. Beekman
Per Munn & Co.
Attorneys.

UNITED STATES PATENT OFFICE.

ABRAM BEEKMAN, OF NEW YORK, N. Y.

IMPROVEMENT IN PROPELLING BOATS.

Specification forming part of Letters Patent No. 143,270, dated September 30, 1873; application filed August 4, 1873.

*To all whom it may concern:*

Be it known that I, ABRAM BEEKMAN, of the city, county, and State of New York, have invented a new and useful Improvement in Paddles, of which the following is a specification:

Figure 1 is a side view of one of my improved paddles shown as applied to a boat. Fig. 2 is a rear view of the same, the boat being shown in cross-section through the line $x\ x$, Fig. 1. Fig. 3 is a detail cross-section of the paddle taken through the line $y\ y$, Fig. 1.

The invention will first be fully described, and then clearly pointed out in the claim.

A represents a boat, which may be of any size or kind. B is the bar or lever of the paddle, to the rear side of the lower end of which are hinged two blades, C, in such a way that when moving forward through the water the pressure of the water will close them, as seen in Figs. 1 and 3. The blades C are kept from closing against each other by one or more stops, D, interposed between them, and attached to the bar B, so that as the paddle begins to make the stroke the pressure of the water may open or spread the blades C into the position shown in Fig. 2. The blades C, when opened, are stopped in position to present the greatest possible surface to the water by one or more stops, E, attached to the bar B. The upper ends of the bar B are designed to be attached to the shafts F, which are arranged, as shown, so as to be operated independently of each other. The shafts F are placed in line with each other, and a pintle, G, may be attached to the end of one shaft to enter a socket in the end of the other shaft, as shown in Fig. 2.

When applied as shown in the drawings, levers H are attached to the inner parts of the shafts F, extending above and below said shafts, and having handles attached to their upper ends, and foot-rests attached to their lower ends, so that the operator can apply hand and foot power, both or either, as may be desired.

Having thus described my invention, I claim as new and desire to secure by Letters Patent—

The tubular crank-shafts F H F H, arranged to turn independently upon the same pintle G, and each provided with a paddle, B C, in the manner and for the purpose described.

ABRAM BEEKMAN.

Witnesses:
C. SEDGWICK,
T. B. MOSHER.